US009562627B2

(12) United States Patent
Stolte et al.

(10) Patent No.: US 9,562,627 B2
(45) Date of Patent: Feb. 7, 2017

(54) LUMINAIRE AND IMPROVED LIGHTING SYSTEM

(71) Applicant: KENALL MANUFACTURING COMPANY, Gurnee, IL (US)

(72) Inventors: Brandon Stolte, Lindenhurst, IL (US); Dawn Grandsart, Chicago, IL (US)

(73) Assignee: KENALL MANUFACTURING COMPANY, Kenosha, WI (US)

(*) Notice: Subject to any disclaimer, the term of this patent is extended or adjusted under 35 U.S.C. 154(b) by 305 days.

(21) Appl. No.: 14/100,457

(22) Filed: Dec. 9, 2013

(65) Prior Publication Data
US 2015/0159845 A1 Jun. 11, 2015

(51) Int. Cl.
F21V 27/02 (2006.01)
F16L 3/12 (2006.01)
F21V 31/00 (2006.01)
F21Y 103/00 (2016.01)

(52) U.S. Cl.
CPC .............. F16L 3/1226 (2013.01); F21V 27/02 (2013.01); F21V 31/005 (2013.01); F21Y 2103/00 (2013.01)

(58) Field of Classification Search
CPC ...... F21V 23/002; F21V 31/005; F21V 27/02; F21V 21/025; F21V 15/01; F21V 15/012; F21V 15/013; F21V 15/015; F21V 23/001; F16L 3/1226; F21Y 2103/00; H02G 3/0658; H02G 3/088; H02G 3/22; F21K 9/17; F21K 9/175; F21K 9/13; F21K 9/30
See application file for complete search history.

(56) References Cited

U.S. PATENT DOCUMENTS

| 5,301,090 | A | 4/1994 | Hed | |
|---|---|---|---|---|
| 5,738,436 | A | 4/1998 | Cummings et al. | |
| 6,133,527 | A * | 10/2000 | Park | H02G 3/18 174/135 |
| 6,197,444 | B1 | 3/2001 | Vackar | |
| 6,375,338 | B1 | 4/2002 | Cummings et al. | |
| 2002/0118537 | A1* | 8/2002 | Segretto | F21S 2/005 362/647 |
| 2004/0082209 | A1 | 4/2004 | Zenaboni | |
| 2004/0105264 | A1 | 6/2004 | Spero | |
| 2007/0076459 | A1 | 4/2007 | Limpkin | |
| 2008/0079137 | A1* | 4/2008 | Lee | F21K 9/00 257/698 |
| 2008/0105682 | A1* | 5/2008 | Goddard | B65D 43/22 220/320 |
| 2009/0073692 | A1 | 3/2009 | Berger et al. | |
| 2009/0290343 | A1 | 11/2009 | Brown et al. | |

(Continued)

Primary Examiner — Anh Mai
Assistant Examiner — Fatima Farokhrooz
(74) Attorney, Agent, or Firm — Marshall, Gerstein & Borun LLP; Randall G. Rueth

(57) ABSTRACT

A luminaire includes a housing defined by a pair of sidewalls, a bottom wall, and a first end wall. The first end wall has a first open-ended slot adapted to receive one or more wires. The luminaire also includes a first bracket removably coupled to the first wall to partially close the open-end of the first slot such that a hole remains. The hole is adapted to securely retain the one or more wires. The luminaire further includes a closure coupled to the housing and configured to close the housing. The closure is configured to include one or more light-emitting components.

27 Claims, 9 Drawing Sheets

(56) References Cited

U.S. PATENT DOCUMENTS

| | | | |
|---|---|---|---|
| 2009/0302034 A1* | 12/2009 | Makela | H02G 3/0658 |
| | | | 220/3.8 |
| 2010/0085748 A1 | 4/2010 | Kelly et al. | |
| 2010/0110684 A1 | 5/2010 | Abdelsamed et al. | |
| 2010/0142202 A1 | 6/2010 | Sugishita et al. | |
| 2010/0280677 A1 | 11/2010 | Budike, Jr. | |
| 2011/0051407 A1* | 3/2011 | St. Ives | F21V 15/015 |
| | | | 362/225 |
| 2011/0164411 A1 | 7/2011 | Sparing et al. | |
| 2011/0273877 A1 | 11/2011 | Reed et al. | |
| 2012/0159821 A1 | 6/2012 | Miletich et al. | |
| 2012/0176795 A1 | 7/2012 | Lynch | |
| 2012/0217882 A1 | 8/2012 | Wong et al. | |
| 2012/0249016 A1 | 10/2012 | Smith | |
| 2012/0293086 A1 | 11/2012 | Ishikita et al. | |
| 2012/0294000 A1 | 11/2012 | Thomas et al. | |
| 2013/0003373 A1 | 1/2013 | Hamby et al. | |
| 2013/0006274 A1 | 1/2013 | Walberg et al. | |
| 2013/0027935 A1 | 1/2013 | Ladewig et al. | |
| 2013/0058108 A1 | 3/2013 | Blincoe et al. | |
| 2013/0063935 A1 | 3/2013 | Thrailkill | |
| 2013/0077311 A1 | 3/2013 | Kinnune et al. | |
| 2013/0208471 A1 | 8/2013 | Lueken et al. | |
| 2013/0258616 A1* | 10/2013 | Chao | H05K 5/069 |
| | | | 361/752 |
| 2014/0169007 A1* | 6/2014 | Polick | F21S 6/003 |
| | | | 362/427 |
| 2014/0268818 A1* | 9/2014 | Huang | F21V 5/04 |
| | | | 362/335 |

* cited by examiner

LUMINAIRE AND IMPROVED LIGHTING SYSTEM

FIELD

The present disclosure generally relates to lighting systems and, more particularly, to a luminaire configured to facilitate an improved lighting system incorporating a plurality of electrically connected luminaires.

BACKGROUND

Many commercial buildings, parking structures, transportation areas or structures, and the like are equipped with lighting systems that typically include several luminaires or light fixtures configured to illuminate certain areas. Some luminaires with LEDs for example can be powered by drivers that are physically wired to the luminaires. In typical lighting systems, the drivers are located in proximity to the luminaires that they power, in part because this arrangement simplifies the installation and wiring of the components.

These typical lighting systems can prove to be quite difficult to install. When multiple luminaires are powered by the same driver, the wire(s) connecting the driver to the luminaires are conventionally manually fed through openings, for example, drilled through each individual luminaire housing. This typically requires the wire(s) to be inserted into one end of the luminaire housing, pulled through the luminaire housing, and then fed out at the other end. This process is repeated for each of the luminaires until all of the luminaires are connected to the driver. Wiring the luminaires in this way can be labor intensive, time consuming, and frustrating, particularly when the luminaires are installed in difficult-to-reach locations, such as a high ceiling or a high-traffic tunnel. Moreover, this process may need to be partially or fully repeated when one or more components of a luminaire, such as a light-emitting component, need to be replaced.

SUMMARY

One aspect of the present disclosure provides a luminaire that includes a housing defined by a pair of sidewalls, a bottom wall, and a first end wall, the first end wall having a first open-ended slot adapted to receive one or more wires. The luminaire also includes a first bracket removably coupled to the first wall to partially close the open-end of the first slot such that a hole remains. The hole is adapted to securely retain the one or more wires. The luminaire further includes a closure coupled to the housing and configured to close the housing. The closure is configured to include one or more light-emitting components.

Another aspect of the present disclosure provides a lighting system that includes a first luminaire, a second luminaire positioned proximate to the first luminaire, and a bracket. The first luminaire includes a first housing and a first closure coupled to the housing and configured to close the first housing. The first housing is defined by a pair of sidewalls, a bottom surface, and a first end wall, the first end wall having a first open-ended slot. The first closure is configured to include one or more light-emitting components. The second luminaire includes a second housing and a second closure coupled to the second housing and configured to close the second housing. The second housing is defined by a pair of sidewalls, a bottom wall, and a second end wall, the second end wall positioned proximate to the first end wall and having a second open-ended slot. The second closure is configured to include one or more light-emitting components. The bracket is removably coupled to at least one of the first and second end walls to at least one of partially close the open-end of the first slot, such that a first hole remains, and partially close the open-end of the second slot, such that a second hole remains. The first and second holes are adapted to accommodate passage of one or more wires.

Another aspect of the present disclosure provides a transition bracket that includes a body, a first pair of legs, a second pair of legs, a first U-shaped slot, and a second U-shaped slot. The first pair of legs are coupled to and extend from a first side of the body. The second pair of legs are coupled to and extend from a second side of the body opposite the first side. The first U-shaped slot is defined by the first pair of legs. The second U-shaped slot is defined by the second pair of legs.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

The present disclosure is generally directed to a luminaire configured to facilitate an improved lighting system that is easier, more effective, and less frustrating to maintain and install. One example of such a luminaire includes a housing, a closure, a slot, and a bracket. The housing is defined by a pair of sidewalls, a bottom wall, and a first end wall. The first-end wall defines the slot, which is adapted to receive one or more wires. The closure is coupled to the housing and is configured to close the housing. The closure includes one or more light-emitting components of the luminaire. The bracket can be coupled to the housing to at least partially close the slot and secure the one or more wires therein. So configured, the luminaire can be quickly and easily wired to other components of the lighting system (e.g., a driver box, other luminaires, etc.). Likewise, components of the luminaire, such as the light-emitting components, can be repaired and/or installed without having to re-wire the luminaire, and, in some cases, the entire lighting system. Additionally, when the first bracket is coupled to the housing and the closure is closed, the bracket can seal the luminaire to the IP66 standard, for example, thereby preventing water (e.g., dripping water, spraying water, water jets), other fluids, and/or particulates (e.g., dust) from entering the luminaire.

Figure 1:
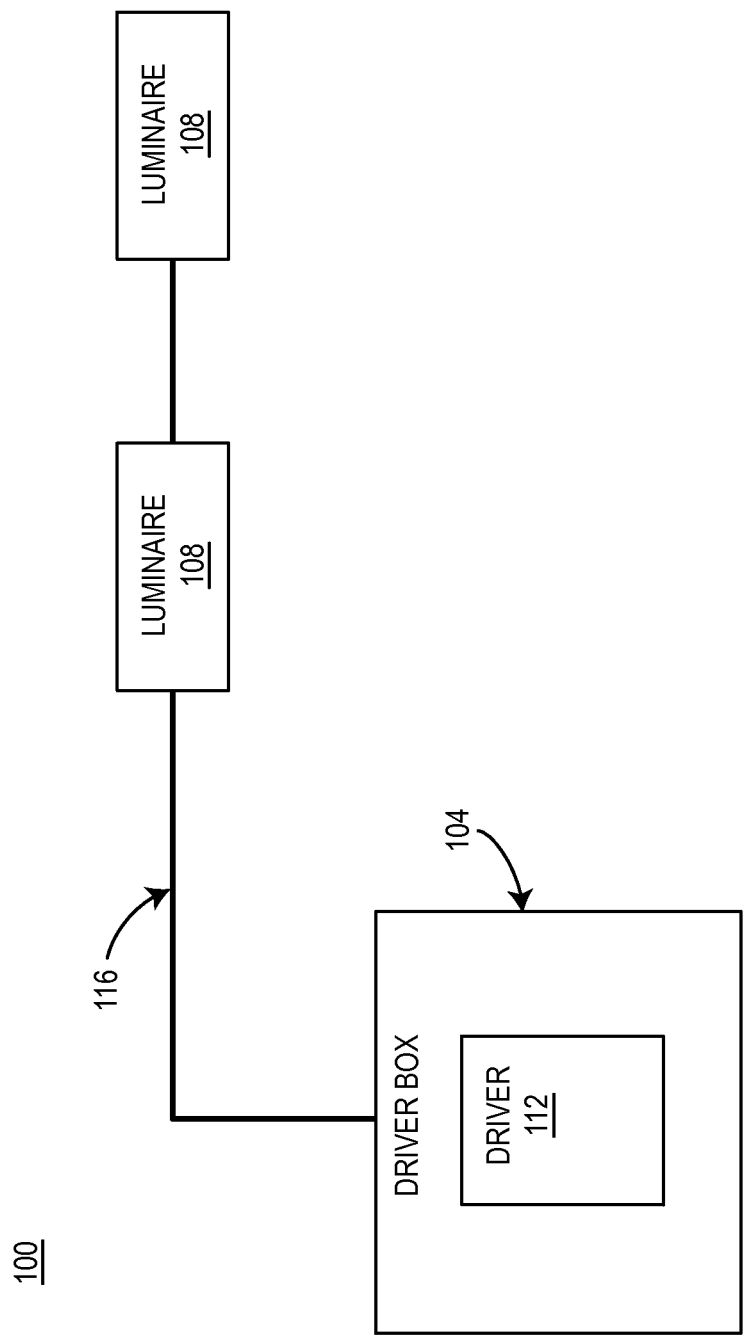
FIG. 1 depicts a schematic representation of one lighting system constructed in accordance with the teachings of the disclosure.

FIG. 1 depicts an exemplary lighting system 100 that includes a driver box 104 and a plurality of luminaires 108 electrically connected to the driver box 104. In this example, the driver box 104 is located remotely from the luminaires 108. The driver box 104 can, for example, be located ten feet, twenty feet, thirty feet, or some other distance from the luminaires 108. The driver box 104 includes a driver 112 configured to electrically power the luminaires 108 via one or more conductors 116 (e.g., one or more wires, one or more cables, and/or one or more other conductors). The driver 112 can be secured in the driver box 104 in any number of ways. The plurality of luminaires 108 can include one or more different types of luminaires, such as, for example, fluorescent, incandescent, plasma, light-emitting diode (LED), or others. As shown in FIG. 1, the luminaires 108 are arranged in an end-to-end series or arrangement. In some embodiments, a sealing element can be coupled to and disposed between two adjacent luminaires 108. In any event, by arranging the luminaires 108 in an end-to-end series, during installation and/or maintenance of the lighting system 100, the one or more conductors 116 generally pass through one end of a first luminaire 108, another end of the first luminaire 108, one end of a second luminaire 108, another end of the second luminaire 108, and so on, as will be described in greater detail below. Typically, such a process involves significant time, labor, and frustration. However, the luminaires 108 described herein are structured to facilitate a quicker and easier way of installing and/or maintaining luminaires 108 in an end-to-end arrangement. The luminaires 108 described herein are also sealed to the IP66 standard, for example, so that fluids (e.g., water) and/or particulates (e.g., dust) are prevented from entering the luminaires 108 and contacting the components of the luminaires 108 (e.g., the light-emitting components).

In other examples, the lighting system 100 can include more than one driver box 104, more or less luminaires 108, and/or more than one driver 112, either in the driver box 104 or in additional driver boxes 104. For example, the driver box 104 can enclose six (6) drivers 112 arranged in rows and columns or in some other way and configured to supply electric power to a maximum of twenty-four (24) luminaires 108. As another example, the lighting system 100 can include multiple driver boxes 104, such as, for example, when hundreds of luminaires 108 are necessary.

Although not specifically illustrated herein, the lighting system 100 can be included or employed in a parking garage (or a floor or section of the parking garage), commercial building (or a portion thereof), roadway, tunnel, or other structure (or a portion thereof), residential home or building, or other indoor or outdoor space or environment. For example, the lighting system 100 can be included in a tunnel or other type of covered roadway through which traffic can pass. As briefly mentioned above, the driver box 104 can be located remotely from each of the luminaires 108 to which it (and more specifically its driver 112) supplies electric power. The luminaires 108 can thus be installed in an end-to-end series on the ceiling of the tunnel, while the driver box 104 can be located in a separate control room, on one of the sides of the tunnel, near a ground level of the tunnel, or in another location. Generally, the more that vehicles reduce their speed prior to or upon entering the tunnel, the higher the risk for accidents. Accordingly, adequate and proper lighting in such tunnels is imperative to reduce lighting contrast between the outside of the tunnel and the interior of the tunnel.

Figure 2:
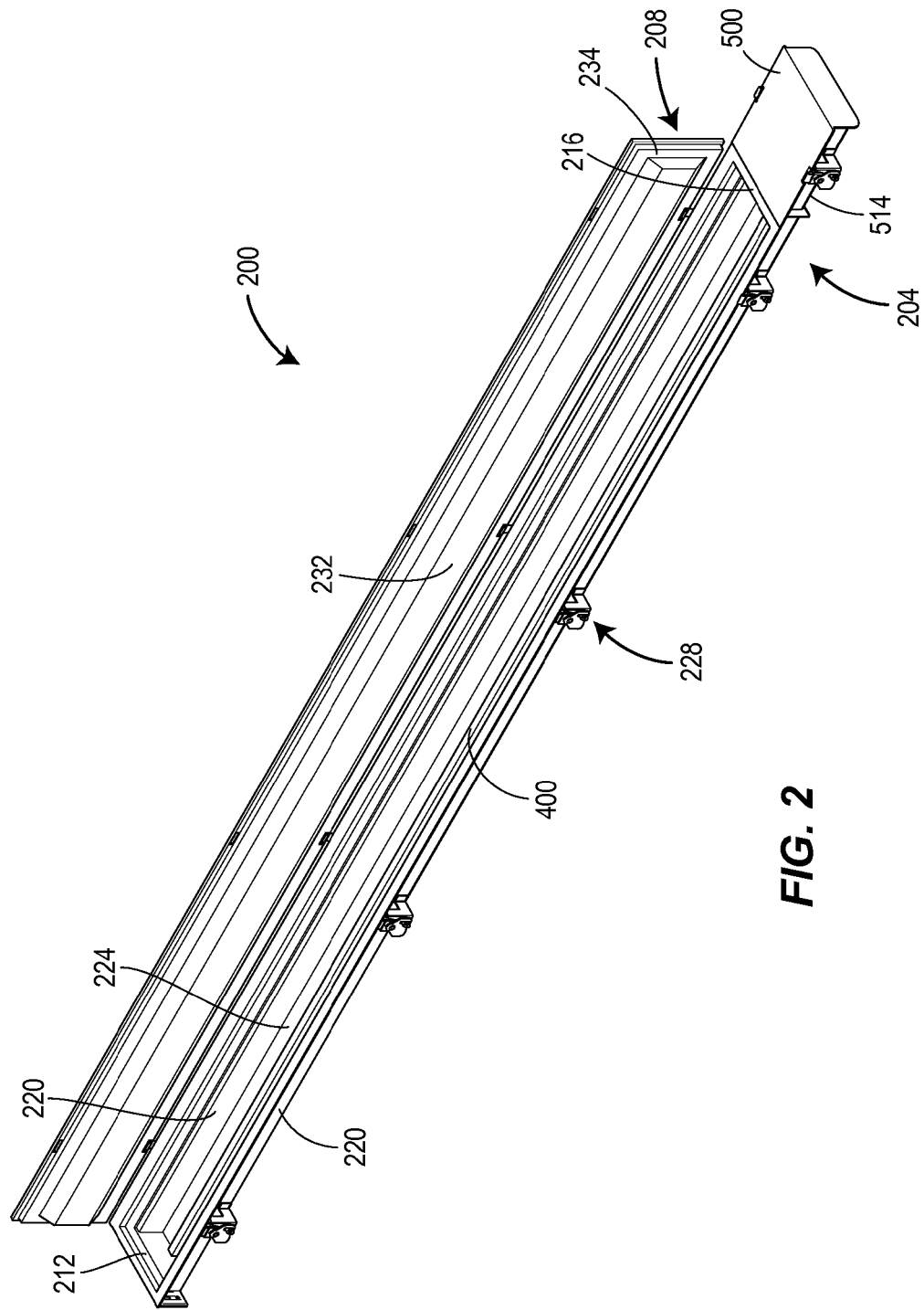
FIG. 2 is a perspective view of one luminaire that can be employed in the lighting system of FIG. 1, the luminaire having a door occupying an open position.
Figure 3:
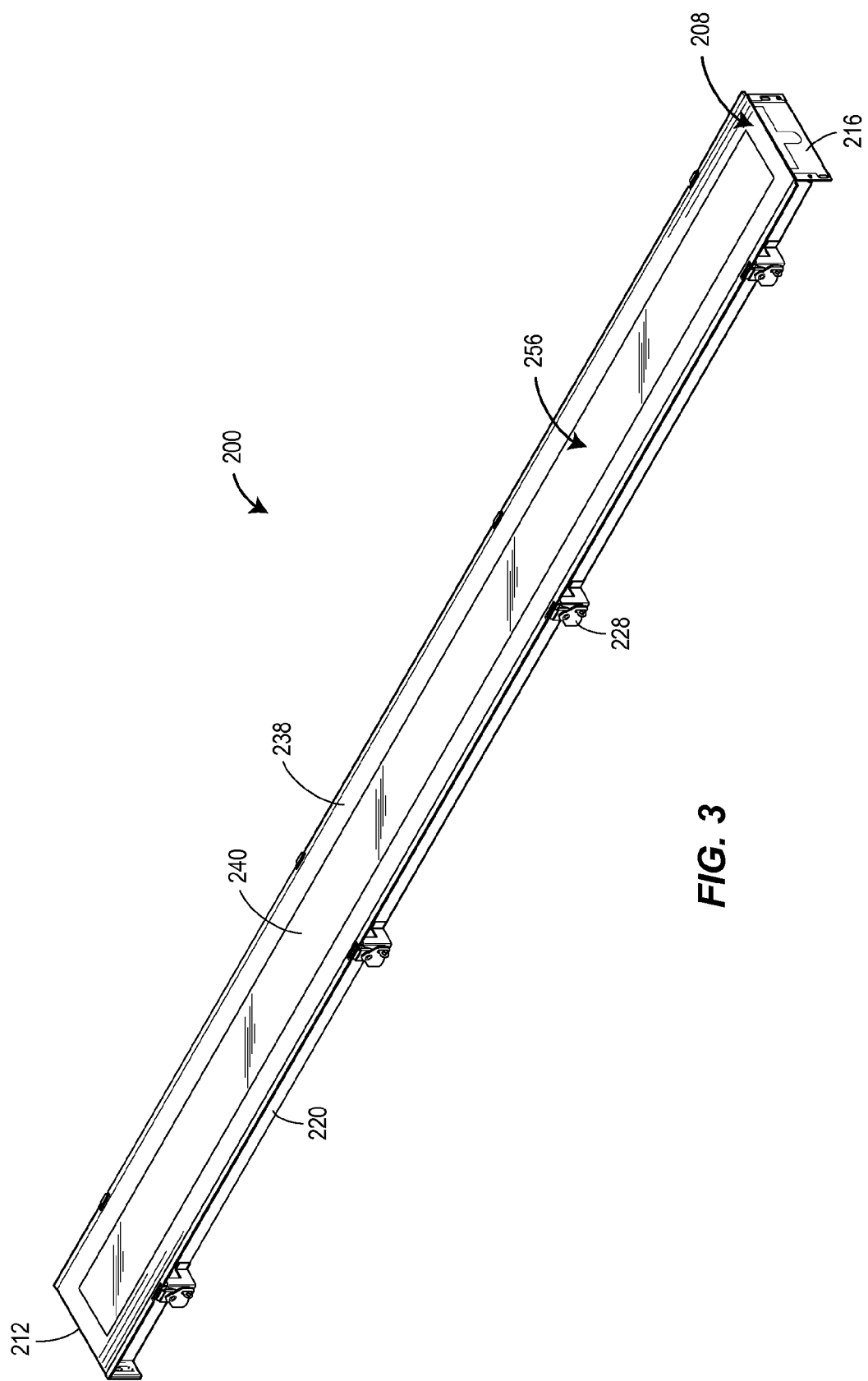
FIG. 3 is a perspective view of the luminaire of FIG. 2, but with the door of the luminaire occupying a closed position.

FIGS. 2 and 3 illustrate an exemplary luminaire 200 that can be included in the lighting system 100. The luminaire 200 has an elongated housing 204 and a closure 208 rotatably coupled to the housing 204. The housing 204, which is made entirely of stainless steel (e.g., 316 Stainless Steel, 304 Stainless Steel), is generally defined by a first end wall 212, a second end wall 216 opposite the first end wall 212, a pair of sidewalls 220 that extend longitudinally between the first and second end walls 212, 216, and a bottom wall 224. The closure 208 in this example is a door rotatably coupled to the housing 204 via a plurality of hinges (not visible in FIGS. 2 and 3) and, when in the closed position shown in FIG. 3, can be secured to the housing via a plurality of latches 228. The latches 228 are, as shown in FIG. 2, rotary latches, but can, in other embodiments be a different type of latch or lock (e.g., a cam lock, a spring latch). The closure 208 has a length that is substantially equal to a length of the sidewalls 220, such that the closure 208 is configured to cover, and completely enclose, the housing 204. The closure 208 includes a chamber 232 in which one or more light-sources, such as, for example, one or more LEDs, can be disposed, a gasket 234 surrounding the chamber 232, and a covering 236 (FIG. 3) that overlies and encloses the chamber 232. The gasket 234 is coupled to an underside of the closure 208 adjacent a perimeter edge of the closure 208 and is configured to facilitate sealing of the chamber 232 when the closure 208 is closed. The covering 236 is substantially flat and includes a frame 238 surrounding a lens 240. The frame 238 is made of stainless steel, but can be made of a different material. The lens 240 can be made of glass, plastic (e.g., acrylic plastic, polycarbonate plastic), or some other material.

In other embodiments, the housing 204 and/or the closure 208 can be constructed differently. The housing 204 can have a different size, shape, and/or be made of one or more materials other than or in addition to stainless steel. In one version, the housing 204 can have a circular shape defined by a bottom wall and a side wall or perimeter edge. In other versions, the housing 204 can have a different shape. Alternatively or additionally, the closure 208 can have a different size and/or shape and/or be coupled to the housing 204 in a different manner. For example, while the closure 208 is described as being a door, the closure can be a cover (e.g., a cover panel), lid, or other closure device. While the closure 208 is described as being rotatably connected to the housing 204, in other versions, the closure 208 may be slidably coupled to the housing 204 or not connected to the housing 204 at all except for the latches 228. As another example, the covering 236 can have a different shape (e.g., can be curved), a different size, or be made of one or more different materials.

Figure 4:
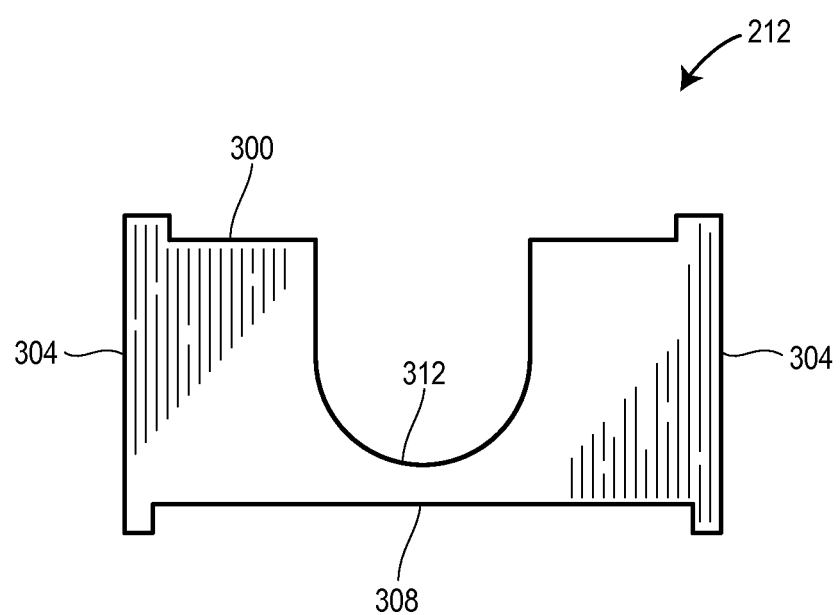
FIG. 4 is an end view of an exemplary first end wall of the luminaire of FIG. 2.

FIG. 4 illustrates further details about the first end wall 212. The first end wall 212 has a laterally-extending top portion 300, longitudinally-extending side portions 304, and a laterally-extending bottom portion 308. The first end wall 212 also includes or defines a first open-ended slot 312 configured to receive one or more conductors. In this example, the open-ended slot 312 has a U-shape and is upwardly open toward the top portion 300 of the first end wall 212 (and in a direction toward the closure 208).

In other examples, the first end wall 212 can be constructed differently. The shape and/or size of the top portion 300, the side portions 304, and/or the bottom portion 308 can vary. Likewise, the open-ended slot 312 can have a different shape. For example, the slot 312 can be open in or toward a different direction (e.g., toward one of the side portions 304) and/or have a circular shape, a rectangular shape, an irregular shape, or other shape.

Although not specifically depicted herein, the second end wall 216 illustrated in FIGS. 2 and 3 can be identical to the first end wall 212, with the same components referenced by common reference numbers. In other words, the second end wall 216, which has a top portion identical to the top portion 300, side portions identical to the side portions 304, and a bottom portion identical to the bottom portion 308, includes or defines a second-open ended slot (not shown) that is identical to the first open-ended slot 312.

Figure 5:
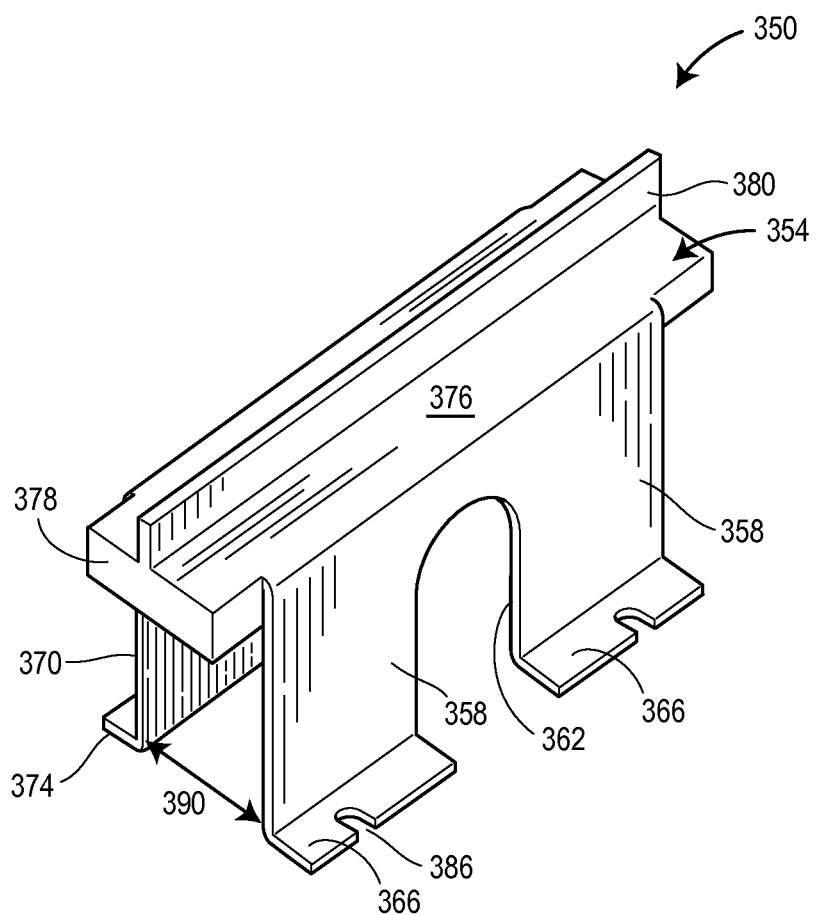
FIG. 5 is a perspective view of an exemplary first bracket that can be coupled to the first end wall of FIG. 4.

FIG. 5 illustrates a first bracket 350 that can be removably coupled to the first wall 212 to partially close the open-end of the first slot 312 to facilitate a seal with the closure 208 when in the closed position, as will be described in greater detail below. The first bracket 350 can be made of the same material as the housing 204, which in this example is stainless steel (e.g., 316 Stainless Steel, 304 Stainless Steel). The first bracket 350 has a body 354, first and second legs 358, a first slot 362, first and second feet 366, third and fourth legs 370, a second slot (not visible in FIG. 5), and third and fourth feet 374.

The body 354 of this version of the bracket 350 has a generally rectangular shape with a top side 376, an underside (not shown), and a perimeter edge 378. The body 354 also includes a vertical sealing wall 380 that projects or extends upwardly from a central portion of the top side 376. The first and second legs 358 extend downwardly from one side of the perimeter edge 378 of the body. The first slot 362 is generally defined by the first and second legs 358. In this example, the first slot 362 has a U-shape and opens in a downward direction (toward the feet 366), such that the first slot 362 has a shape that corresponds to or is complementary with the shape of the slot 312. The first and second feet 366 project outwardly from a bottom end 364 of the first and second legs 358, respectively. The first and second feet 366 can project outwardly at a 90 degree angle relative (i.e., perpendicular) to the body 354 and, more particularly, the bottom end 364 of the first and second legs 358, respectively, or at a different angle (e.g., greater than 90 degrees, less than 90 degrees). Each of the first and second feet 366 includes or defines a semi-circular shaped notch 386 configured to receive a coupling means (e.g., a fastener). The third and fourth legs 370 are coupled to and extend downwardly from the perimeter edge 378, but do so from an opposite side of the edge 378 than the first and second legs 358. The second slot, which is not visible in FIG. 5, is generally defined by the third and fourth legs 370, but is otherwise identical to the first slot 362. The third and fourth feet 374 project outwardly from a bottom end of the third and fourth legs 370. Like the first and second feet 366, the third and fourth feet 374 can project outwardly at a 90 degree angle relative to the body 354, or at a different angle. Though not depicted in FIG. 5, each of the third and fourth feet 374 includes or defines a notch 386, which, as noted above, is configured to receive a coupling means (e.g., a fastener). So configured, the first and second legs 358 and the third and fourth legs 374 form or define a gap 390 therebetween.

In other examples, the first bracket 350 can be constructed differently. The first bracket 350 can, for example, be made of a different material than the housing 204. The shape and/or size of the body 354, the legs 358, the feet 366, the legs 370, and/or the feet 374 can vary. The first slot 362 and/or the second slot can have a different shape. For example, the first slot 362 and/or the second slot can open in or toward a different direction (e.g., toward the body 354) and/or have a circular shape, a rectangular shape, an irregular shape, or other shape. In other examples, the feet 366 and/or the feet 374 can include a different sized and/or shaped notch or can include a coupling means (e.g., a snap component) instead of the notch 386. In yet another example, the first bracket 350 need not include the feet 366 and/or the feet 374. Additionally, in other examples, the sealing wall 380 may not extend up from the top side 376, but rather, may be the top side 376 of the body 354. Other sealing configurations are also intended to be within the scope of the present disclosure.

Although not specifically depicted herein, a second bracket that is structurally identical to the first bracket 350, with the same components referenced by common reference numbers, can be coupled to the second wall 216 to partially close the open-end of the second slot, as will be described in greater detail below.

With reference back to FIG. 2, when the luminaire 200 is installed in the appropriate location (e.g., on the ceiling of a tunnel), a conductor 400 (e.g., a wire, cable, and/or other connection means) can be used to connect the driver box 104 to the luminaire 200. Typically, the luminaire 200 is installed upside down relative to the orientation shown in FIG. 2. With the closure 208 unlocked and rotated (e.g., by gravity) to the open position shown in FIG. 2, the conductor 400 can first be disposed through, and seated or arranged in, the first open-ended slot 312, such that the conductor 400 is disposed in and extends through the housing 204 of the luminaire 200. The conductor 400 can, in turn, be connected to the one or more light-sources disposed in the chamber 232 of the closure 208, using any known manner, such that the driver box 104 (via the driver 112) is configured to supply power to the luminaire 200, particularly the one or more light-sources disposed in the chamber 232. The conductor 400 can then be disposed through, and seated or arranged in, the second open-ended slot defined in the second end wall 216.

It will be appreciated that when the lighting system 100 includes a plurality of luminaires 200, the above-described process can be repeated for one, some, or all of the luminaires 200 in the lighting system 100. It will also be appreciated that when the luminaire 200 is part of an end-to-end or continuous run of luminaires 200, additional conductors 400 can be disposed through, and seated or arranged in, the first open-ended slot 312 and the second open-ended slot in a similar way. Accordingly, the driver box 104 (via one or more drivers 112), using these additional conductors 400, can be configured to supply power to one or more other luminaires 200, such as luminaires 200 that are upstream or downstream of the luminaire 200.

Finally, it should be appreciated that gravity will conventionally pull the one or more conductors 400 down and away from the luminaire 200. Thus, temporary connectors (not shown), such as, for example, one or more conductor clamps, can be employed to temporarily secure the one or more conductors 400 in these positions. The one or more conductors 400 can then be more permanently secured or trapped in these positions using the first bracket 350 and the second bracket, which then also provides the sealing wall 380 for sealing against the closure 208 when closed. The first bracket 350 can be coupled to the first end wall 212 to partially close the open-end of the first slot 312. Specifically, the body 354 of the first bracket 350 can be positioned over the top portion 300 of the first end wall 212, with the first and second legs 358 disposed inward of the first end wall 212 and the third and fourth legs 370 disposed outward of the first end wall 212. In other words, the first end wall 212 can be positioned within the gap 390 formed between the first and second legs 358 and the third and fourth legs 370 of the first bracket 350. The body 354 of the first bracket 350 can contact a portion of the top 300 of the first end wall 212. Friction between the first end wall 212 and the legs 358, 370 can at least initially hold or retain the body 354 in this position. In some embodiments, the one or more temporary connectors can, in turn, be removed. In other embodiments, one or more of the temporary connectors can remain disposed within the housing 204 to facilitate the secure and orderly retention of the one or more conductors 400 therein.

The first bracket 350 can be secured in this position by securing the first and second legs 358 to the housing 204. In this embodiment, a plurality of fasteners (e.g., screws, rivets, adhesives, bolts, PEM studs) can be inserted into the notches 386 formed in the first and second feet 366 to secure the first and second feet 366 to the bottom wall 224 of the housing 204 In other embodiments, the first and second legs 358 can be secured in a different way and/or to a different portion of the housing 204. For example, the gap 390 can be sized so that friction between the first end wall 212 and the first and second legs 358 is all that is required to secure the first and second legs 358 to the housing 204. As another example, the first and second legs 358 can be snapped, glued, or attached in some other way to the housing 204. In yet another example, the first and second feet 366 can be snapped, glued, or attached in some other way to the bottom wall 224 and/or the first and second feet 366 can be secured to the first end wall 212 and/or the sidewalls 220 of the housing 204.

It will be appreciated that the first bracket 350 can be removed from the first end wall 216 in a similar manner, such as, for example, when one or more conductors 400 need to be replaced. It will also be appreciated that the second bracket can be coupled to the second end wall 216 in a similar manner. Likewise, it will be appreciated that when the lighting system 100 includes a plurality of luminaires 200 (e.g., the luminaire 200 is part of an end-to-end or continuous run of luminaires 200), first and/or second brackets can be similarly coupled to first and/or second walls 212, 216 of one or more of these luminaires 200. When, for example, the lighting system 100 includes another luminaire 200 immediately adjacent to the luminaire 200 described above, and the one or more conductors 400 are disposed through, and seated in, this second luminaire 200 as described above, the first bracket 350 can also be coupled to the first or second wall of the second luminaire 200 (depending upon how the luminaire is oriented) to partially close the open-end of the first or second slot of this second luminaire 200. This would typically, but need not, be done at the same time as the first bracket 350 is coupled to the first end wall 212 of the luminaire 200, as described above. In turn, the third and fourth legs 370 can be secured to the housing 204 of this second luminaire 200 in a similar manner as the first and second legs 358 are secured to the housing 204 of the first luminaire 200. Thus, in some embodiments, the same bracket can be used in connection with two different luminaires 200.

Figure 6:
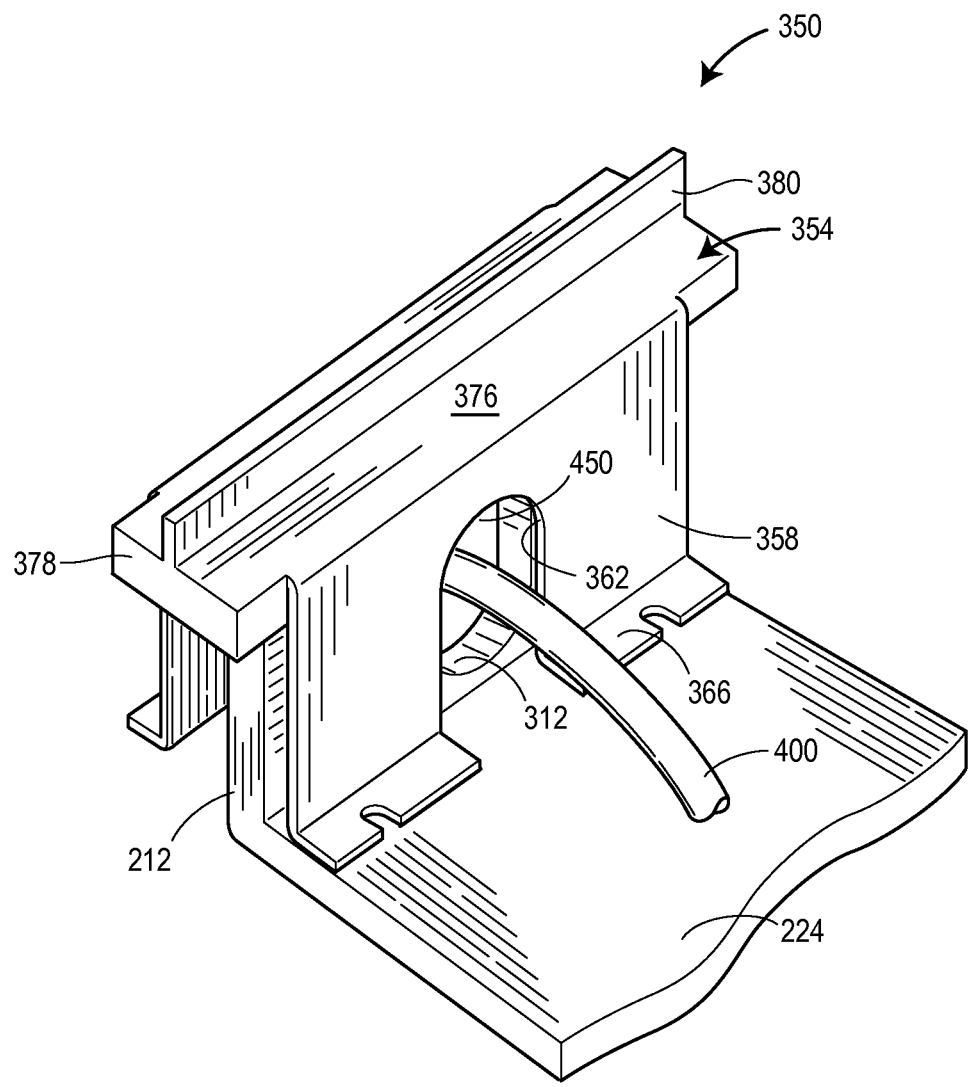
FIG. 6 depicts a perspective view of an end of the luminaire of FIG. 2 when the first bracket of FIG. 5 is coupled to the first end wall of FIG. 4.
Figure 7:
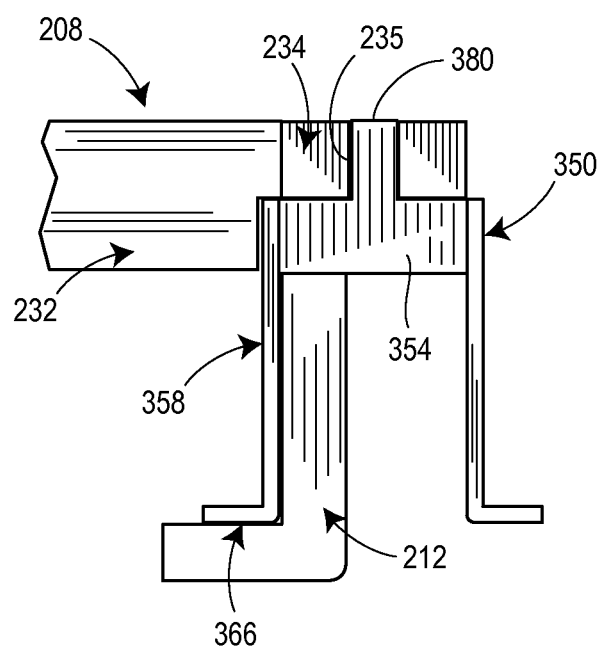
FIG. 7 depicts a cross-sectional view of the end of the luminaire shown in FIG. 6, but with the closure in the closed position and the first bracket sealing against the closure.

FIG. 6 depicts apartial view of one end of the luminaire 200 when the first bracket 350 is coupled to the first end wall 212 as described above. As shown in FIG. 6, because the shape of the slot 362 of the first bracket 350 corresponds to the shape of the slot 312 of the end wall 212, the first bracket 350, when coupled to the first end wall 212, closes off the previously open-ended portion of the first slot 312, such that a substantially circular hole 450 is formed or remains. The circular hole 450 is smaller in size than both of the slots 312, 362. The one or more conductors 400, by virtue of being seated in the first slot 312 before the first bracket 350 was coupled to the first end wall 212, are seated and securely retained or trapped in the circular hole 450. At the same time, with reference to FIG. 7, the vertical sealing wall 380 of the first bracket is configured to act as a seal surface for one end of the luminaire 200. When the closure 208 is closed, an end portion 235 of the gasket 234 is disposed in sealing engagement against the sealing wall 380, such that the two can cooperate to seal the luminaire 200. The gasket 234 and the sealing wall 380 can seal the luminaire 200 to the IP66 standard, for example, such that water, other liquids, or particulates (e.g., dust) from are prevented from entering an interior of the luminaire 200, particularly where the one or more light sources are disposed in the chamber 232 of the closure 208 and where the one or more conductors 400 pass through the housing 204. In the embodiments in which the first bracket 350 is also coupled to the first or second end wall of an immediately adjacent second luminaire 200, the first bracket 350, when coupled to this first or second end wall, can close off the previously open-ended portion of the slot of the first or second end wall, such that a substantially circular hole, similar to the hole 450, is formed or remains. The one or more conductors 400, by virtue of being seated in the slot of the first or second end wall before the first bracket 350 was coupled to the second luminaire 200, are seated and securely retained or trapped in this circular hole. By virtue of the immediate adjacency of the first or second end wall to the first end wall 312, the vertical sealing wall 380 of the first bracket can also act to seal one end of the second luminaire 200 to the IP66 standard as well, thereby preventing, for example, water, other liquids, or particulates (e.g., dust) from entering an interior of the second luminaire 200.

Figure 8A:
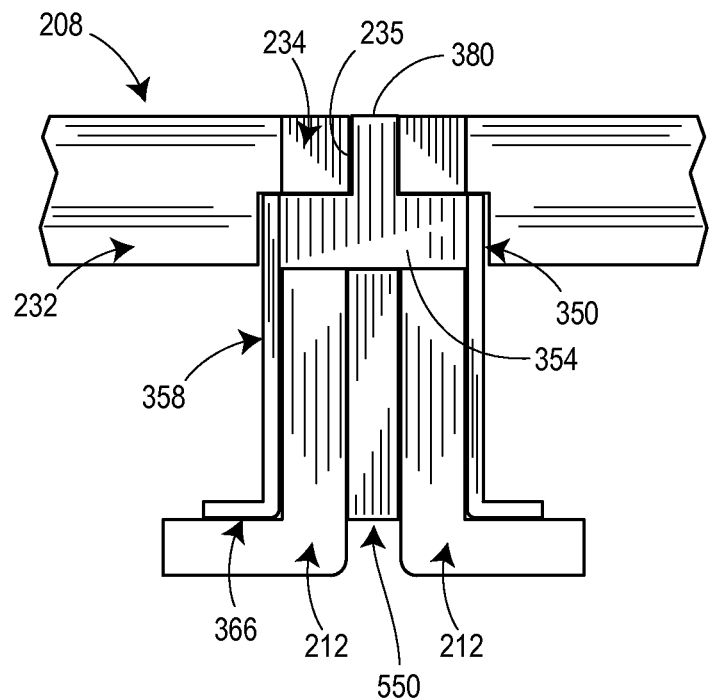
FIG. 8A depicts two adjacent luminaires coupled together via the first bracket and a sealing element disposed between the two adjacent luminaires.
Figure 8B:
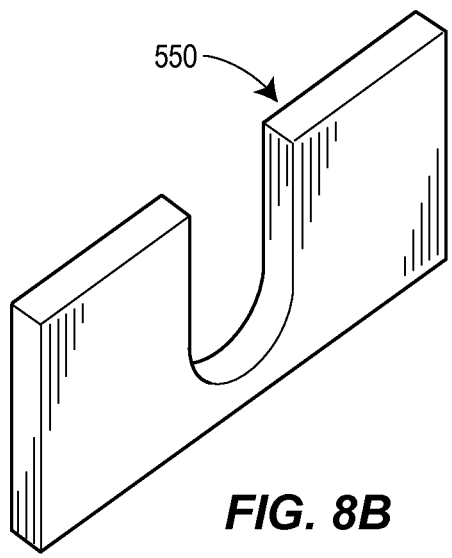
FIG. 8B depicts the sealing element disposed between the two adjacent luminaires in FIG. 8A.

FIG. 8A depicts an example in which the vertical sealing wall 380 of the first bracket 350 can act to seal one end of the first luminaire 200 and an adjacent end of the second luminaire 200. In addition, a sealing element (e.g., a gasket), such as the sealing element 550 illustrated in FIG. 8B, can be coupled to and disposed between the two immediately adjacent luminaires 200. So disposed, the sealing element can seal the space or area between the two immediately adjacent luminaires 200. In the example depicted in FIG. 8A, the sealing element 550 is sandwiched between end walls 212 of the adjacent luminaires 200. In other versions, the sealing element 550 can be glued, snapped, fastened, or secured in some other way to the end walls 212.

Although not depicted herein, it will be appreciated that the second bracket can perform these same functions as well—the second bracket can close off the previously open-ended portion of the second slot, such that a substantially circular hole identical to the hole 450 is formed or remains, in which the one or more conductors 400 can be seated and securely retained; and a vertical sealing wall of the second bracket, identical to the vertical sealing wall 380, can act to seal the other end of the luminaire 200 in a similar manner.

Figure 9:
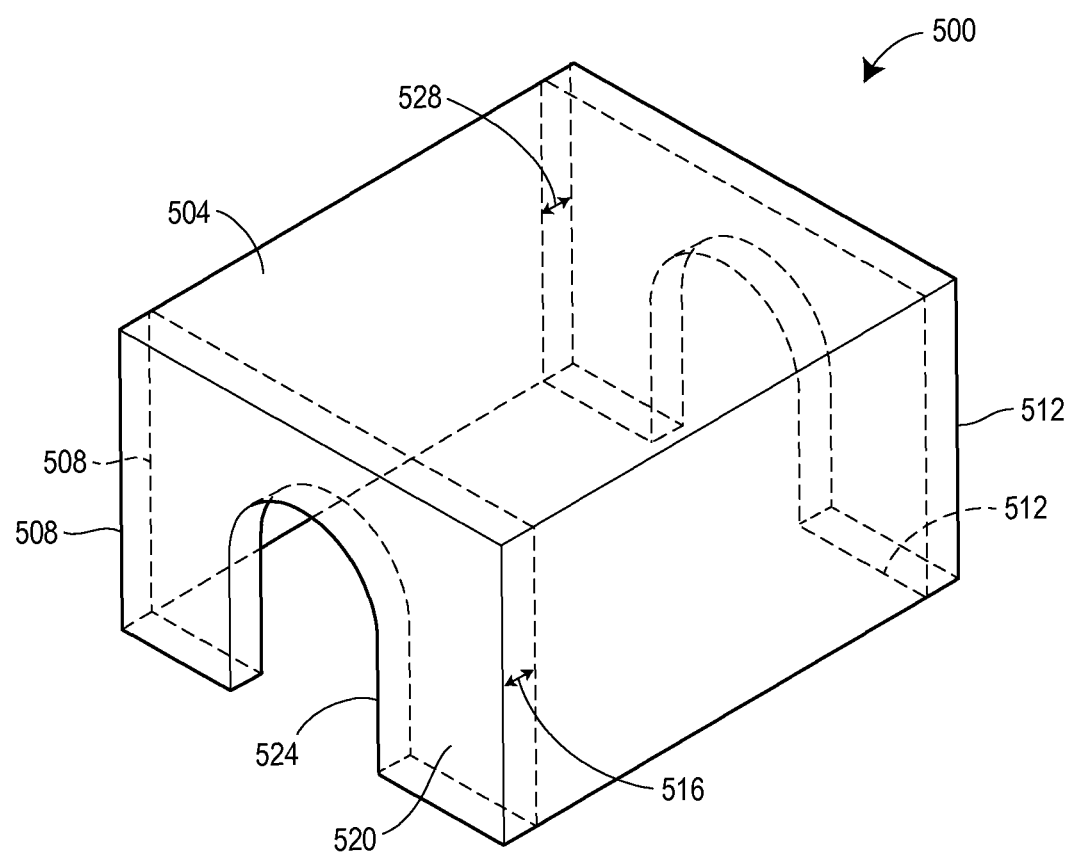
FIG. 9 depicts a perspective view of an exemplary transition box that can be coupled to the luminaire of FIG. 2.

When the luminaire 200 is positioned at a beginning of an end-to-end run of luminaires (i.e., the luminaire 200 is the luminaire most proximate to the driver box 104) or the luminaire 200 is positioned at an end of the end-to-end run of luminaires, a transition box 500 can be coupled to the luminaire 200. FIG. 9 depicts one example of such a transition box 500. The transition box depicted in FIG. 9 includes a top surface 504, a pair of first walls 508, a pair of second walls 512, and a recessed underside 514 defined by and between the walls 508, 512 (see FIG. 2). The pair of walls 508 are coupled to and extend downward from a first portion of the transition box 500. The walls 508 are parallel to, but spaced apart from, one another, such that a gap 516 is defined or formed therebetween. Each of the walls 508 is structurally similar to one side of the first bracket 350. In other words, each wall 508 includes a pair of downwardly extending legs 520 and a U-shaped slot 524 defined by the legs 520. The U-shaped slot 524 of each of the walls 508, like the slot 362 of the bracket 350, corresponds to the slot 312. The walls 512 are coupled to and extend downward from a second portion of the transition box 500. The walls 512 are parallel to, but spaced apart from, one another, such that a gap 528 is defined or formed therebetween. Each of the walls 512 is identical to the walls 508. As such, each wall 512 includes a pair of downwardly extending legs and a U-shaped slot, none of which is visible in FIG. 9. The U-shaped slot of each of the walls 512, like the slot 362 of the bracket 350, corresponds to the slot 312.

In other embodiments, the transition box 500 can be constructed differently. More specifically, the shape and/or size of the top surface 504, the walls 508, and/or the walls 512 can vary. In some embodiments, the transition box 500 only include the walls 508 or the walls 512, not both.

With reference back to FIG. 2, the transition box 500 can be coupled to the first end wall 212 or the second end wall 216 of the luminaire 200. In the example depicted by FIG. 2, a first portion 506 of the transition box 500 (see FIG. 9) is positioned over the top portion 300 of the first end wall 212 or the second end wall 216, such that the first end wall 212 or the second end wall 216 is disposed in the gap 516, between the walls 508. Because the shape of the slot 524 corresponds to the shape of the slot 312 of the first end wall 212 or the second end wall 216, the transition box 500 closes off the previously open-ended portion of the first slot 312, such that a substantially circular hole, similar to the hole 450 described above, is formed or remains. The one or more conductors 400 are seated and securely retained or trapped in this substantially circular hole. At the same time, the connection between the first end wall 212 or the second end wall 216 and the transition box 500 serves to seal the luminaire 200 to the IP66 standard, for example, as the first bracket 350 normally would.

In other embodiments, the transition box 500 can be coupled (e.g., mounted, attached) to the first end wall 212 or the second end wall 216 in a different way. The transition box 500 can, for example, be coupled to the exterior surface of the first end wall 212 or the second end wall 216. In other examples, the transition box 500 can be coupled to a different portion of the luminaire 200 (e.g., the first bracket 350).

When the luminaire 200 is positioned at the beginning of the end-to-end run of luminaires and the transition box 500 is coupled to the first end wall 212, the transition box 500 effectively serves as the conduit connection point between the driver box 104 and the luminaire 200 (as well as any other downstream luminaires 200). In this case, any conductors 400 connecting the driver box 104 with the luminaire 200 and/or any downstream luminaires 200 can pass through the substantially circular hole described above and the recessed underside 512 of the transition box 500. When, as shown in FIG. 2, the luminaire 200 is positioned at the end of the end-to-end run of luminaires and the transition box 500 is coupled to the second end wall 216, the transition box 500 can store any excess conductors 400. In some cases, the transition box 500 can also serve as a conduit pass-through for conductors 400 for one or more other runs of luminaires (e.g., runs of luminaires that are positioned far from the driver box 104). It will also be appreciated that the orientation of the luminaire 200 can be changed, such that the transition box 500 can be coupled to the second end wall 216 when the luminaire 200 is positioned at the beginning of the end-to-end run or the transition box 500 can be coupled to the first end wall 212 when the luminaire 200 is positioned at the end of the end-to-end run. It will also be appreciated that the orientation of the transition box 500 can be changed, such that the second portion of the transition box 500 can be positioned over the top portion 300 of the first end wall 212 or the second end wall 216.

Based on the foregoing description, it should be appreciated that the luminaires described herein can be installed and maintained in a more efficient, more effective, and less frustrating way. For example, the luminaires described herein can be quickly and effectively wired to one another and/or other components in a lighting system. As another example, components of the luminaires described herein, such as, for example, light-emitting components, can be installed and/or repaired without having to re-wire the entire lighting system. At the same time, the luminaires described herein can also include a sealing surface that acts to seal the luminaires to the IP66 standard, for example, such that the luminaires described herein are sealed against water, other liquids, and/or particulates (e.g., dust).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The invention claimed is:

1. A luminaire, comprising:
a housing defined by a pair of sidewalls, a bottom wall, and a first end wall, the first end wall having a first open-ended slot adapted to receive one or more wires;
a first bracket removably coupled to the first end wall to partially close the open-end of the first slot such that a hole remains, the hole adapted to securely retain the one or more wires; and
a closure coupled to the housing and configured to close the housing, the closure adapted to include one or more light-emitting components,
wherein when the first bracket is removably coupled to the first end wall, a first portion of the first bracket is arranged inward of the first end wall within the housing, and a second portion of the first bracket is arranged outward of the first end wall outside of the housing wherein when the first bracket is coupled to the first end wall and the closure is closed, a top surface of the bracket is configured to sealingly engage the closure to seal the luminaire to the ingress protection (IP) 66 standard.

2. The luminaire of claim 1, wherein when the first bracket is coupled to the first wall and the closure is closed, a top surface of the first bracket is configured to sealingly engage the closure to seal the luminaire to the ingress protection (IP) 66 standard.

3. The lighting system of claim 1, wherein each of the one or more light-emitting components is selected from a group consisting of a fluorescent bulb, an incandescent bulb, and a light-emitting diode (LED).

4. The luminaire of claim 1, wherein the first bracket has first and second legs and a U-shaped slot defined by the first and second legs, the first and second legs being secured to the housing, and the U-shaped slot corresponding to the open-ended slot.

5. The luminaire of claim 1, wherein the first bracket includes first and second feet that project outwardly from the first and second legs, respectively, the first bracket configured to be removably coupled to the first wall via the first and second feet.

6. The luminaire of claim 1, wherein at least one of the housing and the first bracket is made of stainless steel.

7. The luminaire of claim 1, wherein the first open-ended slot has a U-shape.

8. The luminaire of claim 1, wherein the housing has a second end wall, the second-end wall defining a second open-ended slot adapted to receive the one or more wires, and the luminaire further comprises a second bracket removably coupled to the second wall to partially close the open-end of the second slot such that a hole remains, the hole adapted to securely retain the one or more wires.

9. The luminaire of claim 1, wherein the closure is configured to close the housing via a plurality of rotary latches.

10. The luminaire of claim 1, wherein the closure includes a gasket, and wherein when the first bracket is coupled to the first wall and the closure is closed, a top surface of the first bracket is configured to sealingly engage the gasket to seal the luminaire to the ingress protection (IP) 66 standard.

11. The luminaire of claim 5, wherein each of the first and second feet defines a notch configured to receive a fastener to removably couple the first bracket to the first wall.

12. A lighting system, comprising:
a first luminaire comprising a first housing and a first closure coupled to the first housing and configured to close the first housing, the first housing defined by a pair of sidewalls, a bottom wall, and a first end wall, the first end wall having a first open-ended slot, and the first closure adapted to include one or more light-emitting components;
a second luminaire positioned proximate to the first luminaire, the second luminaire comprising a second housing and a second closure coupled to the second housing and configured to close the second housing, the second housing defined by a pair of sidewalls, a bottom wall, and a second end wall, the second end wall positioned proximate to the first end wall of the first housing and having a second open-ended slot, and the second closure adapted to include one or more light-emitting components; and
a bracket removably coupled to at least one of the first and second end walls and configured to partially close the open-end of the first slot such that a first hole remains and partially close the open-end of the second slot such that a second hole remains, the first and second holes adapted to accommodate passage of one or more wires,
wherein when the bracket is removably coupled to at least one of the first and second end walls, a first portion of the bracket is arranged within the first luminaire and a second portion of the bracket is arranged in the second luminaire, and
wherein when the bracket is coupled to at least one of the first and second end walls and the first and second closures are closed, a top surface of the bracket is configured to sealingly engage the first and second closures to seal the first and second luminaires, respectively, to the ingress protection (IP) 66 standard.

13. The lighting system of claim 12, further comprising one or more wires configured to supply power to the first and second luminaires, the one or more wires extending through the first luminaire, seated in the first hole, seated in the second hole, and extending through the second luminaire.

14. The lighting system of claim 12, wherein the first and second luminaires are arranged in an end-to-end series with the first and second end walls adjacent to one another.

15. The lighting system of claim 12, further comprising a sealing element coupled to the top surface of the bracket and disposed between the first and second luminaires.

16. The lighting system of claim 12, wherein each of the one or more light-emitting components is selected from a group consisting of a fluorescent bulb, an incandescent bulb, and a light-emitting diode (LED).

17. The lighting system of claim 12, further comprising a driver box including a driver configured to electrically power the first and second luminaires via one or more wires.

18. The lighting system of claim 12, wherein the first luminaire has a third end wall opposite the first end wall, the lighting system further comprising a transition box coupled to the third end of the first luminaire such that a third hole is formed, the third hole adapted to accommodate passage of the one or more wires.

19. The lighting system of claim 12, wherein the bracket is removably coupled to the first and second end walls and configured to partially close the open-end of the first slot such that the first hole remains and partially close the open-end of the second slot such that the second hole remains.

20. The lighting system of claim 17, wherein the driver box is located remotely from the first and second luminaires.

21. A transition bracket for a luminaire having a housing defined by a pair of sidewalls, a bottom wall, and a first end wall, the first end wall having a first open-ended slot configured to receive a wire, the transition bracket comprising:
   a body;
   a first pair of legs coupled to and extending from a first side of the body and a second pair of legs coupled to and extending from a second side of the body opposite the first side, wherein each leg of the first and second pairs of legs extends outward from the body in a first direction;
   a first U-shaped slot defined by the first pair of legs, and a second U-shaped slot defined by the second pair of legs; and
   a sealing wall extending vertically outward from the body in a second direction opposite the first direction, the sealing wall defining a sealing surface configured to sealingly engage a portion of the luminaire to seal the luminaire housing to the ingress protection (IP) 66 standard when the transition bracket is coupled to the first end wall of the housing.

22. The transition bracket of claim 21, further comprising a first pair of feet coupled to and projecting outwardly from the first pair of legs, and a second pair of feet coupled to and projecting outwardly from the second pair of legs.

23. The transition bracket of claim 21, wherein the body, the first pair of legs, and the second pair of legs are made of stainless steel.

24. The transition bracket of claim 22, wherein the first and second pairs of feet are perpendicular to the body of the bracket.

25. The transition bracket of claim 22, further comprising a gap defined between the first pair of legs and the second pair of legs, the gap configured to accommodate the first end wall of the housing.

26. The transition bracket of claim 22, wherein each foot of the first and second pairs of feet extends outward in a direction different from the first and second directions.

27. The transition bracket of claim 24, wherein the first and second pairs of feet each include at least one notch configured to receive at least one fastener to couple the first and second pairs of feet to the bottom surface of the housing.

* * * * *